United States Patent [19]

Murakami et al.

[11] Patent Number: 5,091,025
[45] Date of Patent: Feb. 25, 1992

[54] PROCESS FOR MAKING A GRAPHITE FILM

[75] Inventors: Mutsuaki Murakami, Tokyo; Kazuhiro Watanabe, Kawasaki; Naomi Nishiki, Kyoto; Katsuyuki Nakamura, Osaka, all of Japan

[73] Assignee: Matsushita Electric Industrial Co., Ltd., Japan

[21] Appl. No.: 519,692

[22] Filed: May 7, 1990

Related U.S. Application Data

[63] Continuation-in-part of Ser. No. 409,355, Sep. 19, 1989, Pat. No. 4,983,244.

[30] Foreign Application Priority Data

May 10, 1989 [JP] Japan .................................. 1-116969
May 17, 1989 [JP] Japan .................................. 1-123250

[51] Int. Cl.$^5$ ...................... B29C 65/02; C01B 31/04
[52] U.S. Cl. .................... 156/89; 156/309.9; 264/29.6; 264/29.7; 264/171; 264/248; 264/280; 264/331.12; 264/331.19; 423/448
[58] Field of Search .................... 264/29.1, 29.6, 29.7, 264/171, 232, 234, 241, 248, 280, 331.12, 331.19, 340, 345; 156/242, 306.6, 308.2, 309.9, 313; 423/445, 448, 449

[56] References Cited

U.S. PATENT DOCUMENTS

| | | | |
|---|---|---|---|
| 4,244,934 | 1/1981 | Kondo et al. | 423/448 |
| 4,749,514 | 6/1988 | Murakami et al. | 252/500 |
| 4,876,077 | 10/1989 | Murakami | 423/448 |
| 4,888,242 | 12/1989 | Matsuo et al. | 424/448 X |
| 4,915,984 | 4/1990 | Murakami | 264/29.1 X |
| 4,954,193 | 9/1990 | Murakami et al. | 156/155 |
| 4,983,244 | 1/1991 | Murakami et al. | 264/29.6 X |

FOREIGN PATENT DOCUMENTS 203581 12/1986 European Pat. Off. .
205970 12/1986 European Pat. Off. .
3505656 8/1986 Fed. Rep. of Germany .

OTHER PUBLICATIONS

U.S. patent application Ser. No. 316,055, entitled "Optical Elements for Radiation Comprising Graphite Films".
U.S. patent application Ser. No. 334,519, entitled "Electroaccoustic Diaphragm and Method of Making the Same".
U.S. patent application Ser. No. 519,692, entitled "Process for Making Graphite Films".
U.S. patent application Ser. No. 677,557, entitled "Process for Preparing Graphite Film or Block from Polyamido Acid Films".
U.S. patent application Ser. No. 919,117, entitled "Radiation Optical Element".

Primary Examiner—Leo B. Tentoni
Attorney, Agent, or Firm—Lowe, Price, LeBlanc & Becker

[57] ABSTRACT

A process for making an artificial graphite film from a graphitizable polymer is described. In the process, a starting polymer film having a defined thickness is thermally treated at a temperature of not lower than 2400° C. in an inert gas to graphitize the film, and rolled to obtain a graphite film. The graphite film has good flexibility and elasticity with relatively smooth surfaces.

11 Claims, 2 Drawing Sheets

PROCESS FOR MAKING A GRAPHITE FILM

This application is a continuation-in-part of U.S. patent application Ser. No. 07/409,355, filed Sept. 19, 1989, now U.S. Pat. No. 4,983,244.

BACKGROUND OF THE INVENTION

1. Field of the Invention

This invention relates to a process for making a graphite film having good flexibility and elasticity and adapted for use as heating elements, structural materials, gaskets, and heat-resistant sealing materials.

2. Description of the Prior Art

Since graphite has remarkably high resistances to heat and chemicals and high electric conductivity, it is very important as an industrial material. In fact, graphite has wide utility in the fields of electrodes, heating elements, structural materials, gaskets, heat-resistant sealing materials and the like. Natural graphite may be used for the above purpose but natural graphite of good quality is obtained only in very limited amounts of production. Natural graphite is usually available in the form of powders or blocks which are difficult to handle. Accordingly, artificial graphite has been produced instead. Especially, film-like graphite does not occur naturally and has to be artificially made.

A typical process of producing artificial graphite is a so-called expansion technique. In this technique, natural graphite is immersed in a mixture of concentrated sulfuric acid and concentrated hydrochloric acid and subsequently heated to expand graphite layers, thereby obtaining artificial graphite. The thus obtained graphite is then washed to remove the acid mixture and pressed at high pressure to obtain a graphite film.

However, the graphite film obtained in this manner is nothing like natural single crystal graphite with respect to various characteristics. For instance, the electric conductivity is usually at about $1.5 \times 10^3$ S/cm whereas the single crystal graphite has an electric conductivity of $2.0 \times 10^4$ S/cm. The film strength is poor because of the formation from powder. In addition, large amounts of the acids are necessary for the preparation of the artificial graphite with an attendant problem on the generation of $SO_x$ and $NO_x$ gases. The use of the graphite film has the problem that since the acids used for the preparation of graphite cannot be completely removed, corrosion of metals which are used in contact with the film occurs owing to the leaching-out of the residual acid. When the known graphite film is applied as a gasket, the above problems become more serious. In fact, the graphite gasket which has been obtained in a manner as stated above has never been employed in high temperature and high pressure systems or vacuum systems which have to be completely free of sulfur or acids. Moreover, since a starting material is graphite powder, a difficulty is involved in obtaining a thin film whose thickness is less than 0.1 mm with a limitation placed on film strength. Accordingly, there is a demand for the development of a process for making graphite with high quality without resorting to the known expansion technique.

To solve the above problems, we developed and proposed a process for obtaining a graphite film directly from a film of a specific type of polymer by thermally treating the polymer film for graphitization. This thermal treating process is far simpler and easier than the known technique, from which not only there is obtained graphite whose physical properties are nearly as good as those of single crystal graphite, but also any problem of the residual acid is not involved. However, this process is disadvantageous over the expansion technique in that only a relatively thin graphite film is obtained. More particularly, if the starting film has a thickness of not larger than 25 $\mu$m, a graphite film having a thickness within 15 $\mu$m can be obtained according to the thermal treatment procedure. Over 25 $\mu$m, it is usual that because of the generation of gases from the inside of the starting film during the thermal treatment, the resultant film becomes ragged on the surfaces thereof. Thus, film-like graphite with good quality cannot be obtained. The mere heating of polymer film makes it difficult to obtain a graphite film whose thickness is over 15 $\mu$m.

SUMMARY OF THE INVENTION

It is an object of the invention to provide a process for making an artificial graphite film directly from polymer film by thermal treatment, which can solve the problems involved in the prior art processes or techniques.

It is another object of the invention to provide a process for making an artificial graphite film which has characteristics which are nearly as good as those of single crystal graphite and which has good flexibility, toughness and smooth surfaces.

It is a further object of the invention to provide a process for making an artificial graphite film which has a relatively large thickness of not less than 25 $\mu$m and is particularly suited for use as a heating element, a structural material, a gasket or a heat-resistant sealing material with or without combination with other materials such as metals.

The above objects can be a achieved, according to the invention, by a process for making an artificial graphite film which comprises providing a film of a polymer selected from the group consisting of polyphenyleneoxadiazole, polybenzothiazole, polybenzobisoxazole, poly(pyromellitimide), poly(p-phenyleneisophthalamide), poly(m-phenylenebenzoimidazole), poly(phenylenebenzobisimidazole), polythiazole and poly-para-phenylenevinylene, the film having a thickness of not larger than 400 $\mu$m, subjecting the film to thermal treatment at a temperature of not lower than 2400° C. in an inert gas to graphitize the at least one film, and rolling the graphitized film to obtain a graphite film having good flexibility and elasticity.

BRIEF DESCRIPTION OF THE DRAWINGS

FIGS. 1a to 1c are, respectively, schematic sectional views showing graphite films wherein FIG. 1a shows a graphite film obtained by a prior art process and FIGS. 1b and 1c are, respectively, graphite films obtained prior to and after rolling according to the process of the invention;

FIGS. 3a to 3c are, respectively, schematic views showing fabrication of a composite material consisting of a metal sheet having a perforated structure and graphite films wherein FIG. 3a is a schematic perspective view of the composite material on the way of its fabrication, FIG. 3b is an enlarged view of region A of the metal sheet of FIG. 3a, and FIG. 3c is a section of the composite material.

DETAILED DESCRIPTION AND EMBODIMENTS OF THE INVENTION

Figure 1A:

The process for making a graphite film according to the invention comprises the following three steps: (1) providing a polymer film having a defined range of thickness wherein the polymer selected should be graphitizable; (2) thermally treating the polymer film at a defined range of temperature under isotropic pressure conditions to obtain a graphite film; and (3) subjecting the graphite film to rolling to obtain a film having smooth surfaces with good flexibility and elasticity.

In the first step, there is provided a polymer film selected from polyphenyleneoxadiazoles (POD), polybenzothiazole (PBT), polybenzobisthiazole (PBBT), polybenzooxazole (PBO), polybenzobisoxazole (PBBO), poly(pyromellitimide) (PI), poly(phenyleneisophthalamide) (PPA), poly(phenylenebenzoimidazole) (PBI), poly(phenylenebenzobisimidazole) (PPBI), polythiazole (PT), and poly(para-phenylenevinylene) (PPV). The polyphenyleneoxadiazoles include poly-phenylene-1,3,4-oxadiazole and isomers thereof. The polymellitimides are polyimides having recurring units of the following general formula

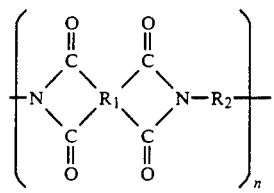

wherein
$R_1 =$

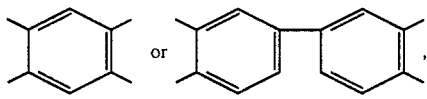

$R_2 =$

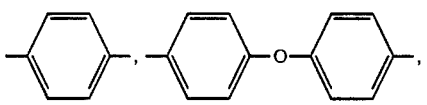

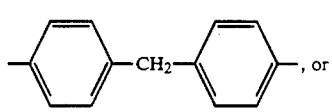

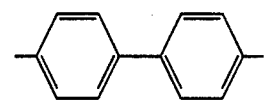

These polymers are capable of conversion into graphite of good quality when thermally treated in an appropriate manner. Although the polymer for the starting film is stated as selected from POD, PBT, PBBT, PBO, PBBO, PI, PPA, PBI, PPBI, PT and PPV, other polymers which can yield graphite of good quality by thermal treatment may also be used in the process of the invention.

The starting film should have a thickness of not larger than 400 μm. If a film whose thickness is over 400 μm is used, a graphite film of good quality is difficult to obtain even according to the process of the invention but may become ragged on the surfaces thereof. The thickness of the starting film to which the process of the present invention is appropriately applied is generally in the range of not larger than 400 μm, preferably from 25 to 200 μm.

The starting polymer film is subsequently thermally treated at a final treating temperature of not lower than 2400° C. If the thermal treatment temperature is lower than 2400° C., the resulting graphite film becomes hard and brittle. Such a graphite film may not be rolled owing to the tendency toward breakage. As is particularly described in examples, the starting film may be pre-heated for carbonization prior to the final thermal treatment. For instance, the film is pre-heated at a heating rate of 2° to 50° C./min. up to 1000° C. and kept at the temperature for a time sufficient for the carbonization. The pre-heating is preferably effected in an inert gas such as nitrogen, argon or the like.

In the process of the invention, the thermal treatment in a temperature range over 1600° C. should be effected in an inert gas of the type as mentioned above at normal pressures or under pressure. When the thickness of the starting film is not larger than 100 μm, the thermal treatment may be appropriately carried out at normal pressures. Over 100 μm, the thermal treatment should be effected under pressure. The pressure necessary for the treatment may depend on the thickness of the film and is generally in the range of from 0.1 kg/cm² to 50 kg/cm². The pressure to be applied should be isotropic. For instance, a method of hot pressing the starting film while sandwiching it between sheets or plates such as of graphite is not suited for the practice of the invention. In this case, the pressure is applied only vertically, so that free expansion or contraction of the film is impeded with the crystallites or crystals of graphite being broken owing to the gas generated during the thermal treatment. In contrast, when the thermal treatment is carried out under isotropic pressure conditions according to the invention, the amount of generated gas and the manner of the generation can be controlled as desired. This entails formation of a graphite film which is foamed owing to the generation of gas but the foaming is uniform as a whole. This is completely different from the ragged state as mentioned before. The uniformly foamed and ragged states are, respectively, illustrated in FIGS. 1a and 1b.

The time for the thermal treatment at 2400° C. or over depends on the temperature and the type of starting film.

Figure 1B:
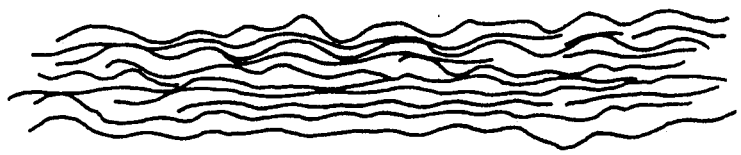
Figure 1C:
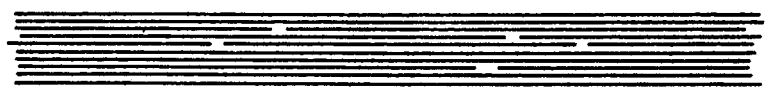

The thus graphitized film is subjected to rolling in the practice of the invention. The uniformly foamed film obtained above is fragile and is apt to break. When rolled, the film is converted into a graphite film having good toughness and flexibility. The rolling procedure is usually carried out by passing the film between two metal or ceramic rolls although any means having principally a similar effect may be used for this purpose. For instance, the graphite film with a uniformly foamed state as shown in FIG. 1b is rolled to obtain a film as shown in FIG. 1c. The graphite in the state of FIG. 1b becomes foamed but crystallites of the graphite are continuous and large in size. When rolled, the crystallites are aligned in one direction and the resultant film have good physical properties. The foamed graphite film which can be converted into a graphite film with good physical properties by rolling is only one which is uniformly foamed. With the film foamed in such a state as shown in FIG. 1a, the properties of the film cannot be improved by the rolling.

The rolling should preferably be conducted at normal temperatures or elevated temperatures at a linear or nip pressure of not less than 2 kg/cm, under which a graphite film of good quality can be obtained with smooth surfaces.

The thus obtained graphite film has so good physical properties that it can be appropriately used, for example, as a gasket. When used singly, the graphite film exhibits good sealing properties and resistances to heat, pressure and chemicals. If the graphite film is thin, a plurality of the films can be used by superposition with similar results.

Figure 3A:
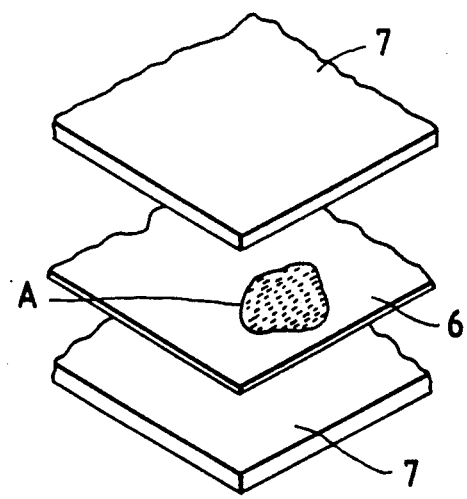
Figure 3B:
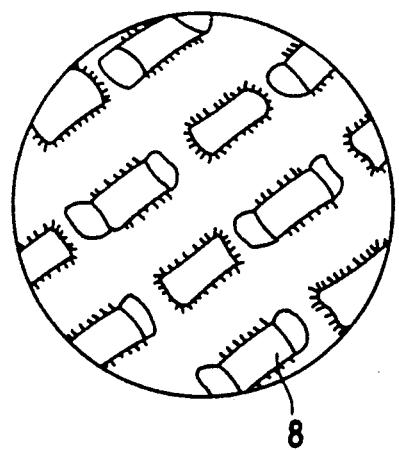
Figure 3C:
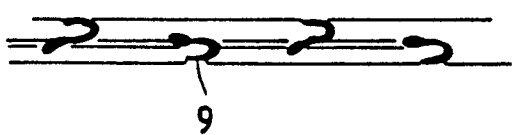

Since the graphite film obtained by the invention is highly pure, it can be used as composite films in combination with various metal films or sheets. Examples of the metals include copper, iron, chromiun, nickel, stainless steels, and other alloys. The metal may be used not only in the form of a film or sheet, but also in the form of meshworks, plates and the like. Especially, as shown in FIGS. 3a to 3c, a metal sheet or plate having a perforated structure is very effective in enhancing bonding between the graphite film and the metal sheet. In the figures, reference numeral 6 indicates a metal plate and reference numeral 7 indicates a graphite film. The metal plate 6 has a perforated structure A, which is particularly shown in FIG. 3b. In FIG. 3b, reference numeral 8 is a perforated portion. When the graphite films 7 sandwiching the metal sheet are pressed, the graphite films 7 and the metal sheet 8 are fixed together through unfolded metal portions 9 as shown in FIG. 3c.

The present invention is more particularly described by way of examples.

EXAMPLE 1

A 75 μm thick polyparaphenylene-1,3,4-oxadiazole film was heated at a rate of 10° C./minute to 1000° C. in an atmosphere of nitrogen gas by the use of an electric furnace LTF-8, made by Sankyou Electric Furnace Co., Ltd. and maintained at 1000° C. for 1 hour. This was a preliminary thermal treatment. The resulting carbonized film was set in hollow cylinder made of graphite so that it could be freely expanded or contracted. The cylinder having the film therein was heated at a rate of 20° C./minute to 3000° C. by the use of a ultra high-temperature furnace 46-5, made by Shinsei Electric Furnace Co., Ltd. The heating was conducted in an atmosphere of argon and at different ambient pressures including a normal pressure, 0.2 kg/cm² and 1.0 kg/cm².

The graphite obtained at a normal pressure became ragged on the surfaces thereof owing to foaming. In contrast, the films obtained under pressures of 0.2 and 1.0 kg/cm² were uniform in the foaming.

The thus obtained films were passed between two stainless steel rolls for rolling treatment. Although the sample obtained at a normal pressure could not be rolled, the other two samples were rolled to obtain flexible and tough films. The thus obtained films were subjected to measurement of tensile strength with the results shown in Table 1 below.

TABLE 1

|  | Rolling | Tensile Strength |
| --- | --- | --- |
| normal pressure | no | 120 kgf/cm² |
| 0.2 kg/cm² | no | 300 |
|  | yes | 430 |
| 1.0 kg/cm² | no | 340 |
|  | yes | 520 |

As will become apparent from the above results, the graphite films obtained under pressure during the thermal treatment have high tensile strength than under normal pressure. The rolling further improves the tensile strength.

The electric conductivity along the film surface was $1.5 \times 10^3$ S/cm for the film obtained at a normal pressure and 1.6 to $2.0 \times 10^4$ S/cm for the other films obtained under pressure. The electric conductivity of the films obtained under pressure was nearly as good as that of single crystal graphite.

The elementary analysis revealed that the films consisted of 100% carbon with other elements being not detected. Thus, the process of the invention can yield graphite films of high quality with high mechanical strength.

Figure 2:
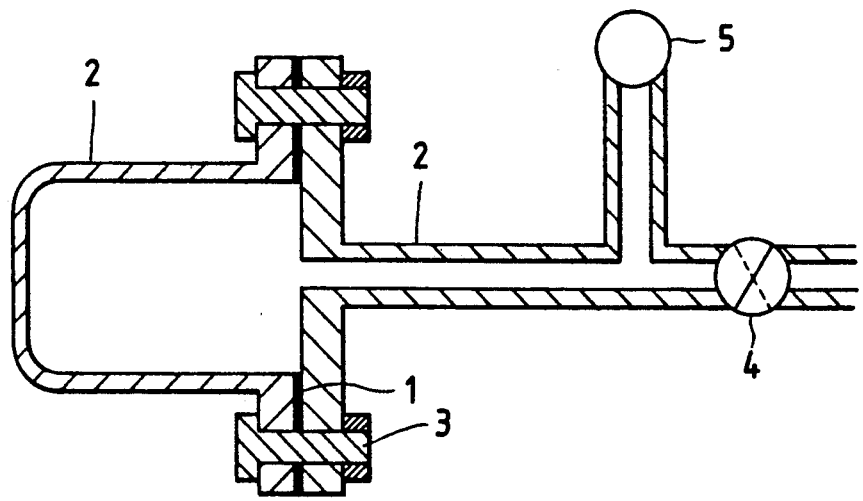
FIG. 2 is a schematic illustrative view of an apparatus for testing graphite film with respect to sealing properties, and heat and pressure resistances.

The sealing properties of the film obtained according to the invention was checked by the use of an apparatus shown in FIG. 2. More particularly, a film 1 was sandwiched between two stainless steel pipes 2 with a structure shown in the figure. The pipes 2 were fastened with bolts 3, followed by evacuation to check the sealing properties. In the figure, reference numeral 4 indicates a vacuum cock and reference numeral 5 indicates a vacuum gauge. Ten hours after the measurement, the degree of vacuum was not changed, thus the graphite film 1 had good sealing properties. Moreover, the sealed portion of the apparatus was placed in an electric furnace at 400° C. to check the variation in the degree of vacuum. The variation in the degree after 10 hours was less than 1%, ensuring good sealing property of the film.

The above procedure for checking the sealing property was repeated except that the pressure in the inside was 50 kg/cm² thereby observing the variation in the pressure. After 10 hours, no change in the pressure was observed.

EXAMPLE 2

Polypyromellitimide films (Du Pont de Nemours, Kapton H film) having thicknesses of 25 μm, 50 μm, 75 μm and 125 μm were thermally treated in the same manner as in Example 1 using a maximum heating temperature of 2800° C., followed by subjecting the respective films to rolling in the same manner as in Example 1. The resultant graphite films were subjected to a tensile strength test with the results shown in Table 2.

TABLE 2

| Thickness of Starting Film | Ambient Pressure | Rolling | Tensile Strength |
| --- | --- | --- | --- |
| 25 μm | normal pressure | no | 600 kgf/cm² |
|  |  | yes | 630 |
|  | 0.2 kg/cm² | no | 620 |
|  |  | yes | 650 |
|  | 1.0 kg/cm² | no | 610 |
|  |  | yes | 680 |
| 50 μm | normal pressure | no | 520 kgf/cm² |
|  |  | yes | 580 |
|  | 0.2 kg/cm² | no | 600 |
|  |  | yes | 640 |

TABLE 2-continued

| Thickness of Starting Film | Ambient Pressure | Rolling | Tensile Strength |
|---|---|---|---|
| | 1.0 kg/cm² | no | 610 |
| | | yes | 650 |
| 75 μm | normal pressure | no | 220 kgf/cm² |
| | | yes | 290 |
| | 0.2 kg/cm² | no | 290 |
| | | yes | 510 |
| | 1.0 kg/cm² | no | 310 |
| | | yes | 540 |
| | 2.0 kg/cm² | no | 350 |
| | | yes | 570 |
| 125 μm | normal pressure | no | 100 kgf/cm² |
| | 0.2 kg/cm² | no | 220 |
| | | yes | 460 |
| | 1.0 kg/cm² | no | 250 |
| | | yes | 490 |
| | 5.0 kg/cm² | no | 290 |
| | | yes | 530 |
| | 10.0 kg/cm² | no | 450 |
| | | yes | 600 |

The thermal treatment at normal pressures gave ragged films from the starting 75 μm and 125 μm thick films, and thus, uniform films of good quality could not be obtained. The films obtained under other conditions could converted into flexible films by rolling. As will be apparent from the above results, when the thickness of the starting film is about 25 μm, the thermal treatment under pressure is not necessarily required. The improvement in the characteristic property by the rolling is not so pronounced. In contrast, the effects of the thermal treatment under pressure and the rolling become more pronounced for a larger thickness of the starting film with a greater pressure at the time of the thermal treatment being necessary for a greater thickness.

The electric conductivity of the graphite films other than the ragged ones is in the range of from 1.4 to $2.0 \times 10^4$ S/cm, which is nearly as good as that of the single crystal graphite. The elementary analysis revealed that the respective films consisted of 100% carbon with other elements being not detected.

Thus, the graphite films having good mechanical strength and high quality could be according to the process of the invention. When tested in the same manner as in Example 1, these graphite films exhibited good sealing properties and good resistances to heat and pressure.

EXAMPLE 3

Among the graphite films obtained in Example 2, the graphite film which has been obtained by the thermal treatment of the 125 μm thick film at an ambient pressure of 5 kg/cm² had good characteristics with respect to the sealing property and resistances to pressure and heat when determined in the same manner as in Example 1. Two graphite films used above were superposed and subjected to the same tests, with the result that little change was involved in the properties as a gasket.

EXAMPLE 4

A 40 μm thick copper film was interposed between two graphite films used in Example 3 and subjected to measurement of properties as a gasket according to the procedure of Example 1. As a result, it was found that the gasket having such a composite structure as set out above exhibited good sealing property and resistances to heat and pressure.

Next, two graphite films used in Example 3 were used to sandwich a 20 μm stainless steel film therebetween and subjected to measurement of properties as a gasket. As a result it was found that the gasket having such a structure as indicated above was excellent in the sealing properties and the resistances to heat and pressure.

EXAMPLE 5

A soft steel sheet 6 having such a perforated structure as shown in FIG. 3a was interposed between two graphite films 7 as used in Example 3 to determine properties as a gasket in the same manner as in Example 1. As a result it was found that such a gasket had good sealing properties and resistances to heat and pressure.

EXAMPLE 6

Films of POD, PBT, PBBT, PBO, PBBO, PI, PPA, PBI, PPBI, PT and PPV, each having a thickness of 50 μm, were thermally treated at a temperature of 3000° C. at a normal pressure and at a pressure of 2.0 kg/cm² and then rolled in a manner similar to Example 1. The resultant graphite films were each subjected to measurement of tensile strength. The results are shown in Table 3.

TABLE 3

| | Ambient Pressure (kg/cm²) | Rolling | Tensile Strength (kg/cm²) |
|---|---|---|---|
| POD | normal pressure | no | 280 |
| | | yes | 530 |
| PBT | normal pressure | no | 310 |
| | | yes | 490 |
| PBBT | normal pressure | no | 300 |
| | | yes | 510 |
| PBO | normal pressure | no | 310 |
| | | yes | 410 |
| PBBO | normal pressure | no | 270 |
| | | yes | 580 |
| PI | normal pressure | no | 520 |
| | | yes | 580 |
| PPA | normal pressure | no | 390 |
| | | yes | 500 |
| PBI | normal pressure | no | 390 |
| | | yes | 490 |
| PPBI | normal pressure | no | 400 |
| | | yes | 550 |
| PT | normal pressure | no | 360 |
| | | yes | 480 |
| PPV | normal pressure | no | 350 |
| | | yes | 520 |
| POD | 2.0 | no | 480 |
| | | yes | 630 |
| PBT | 2.0 | no | 400 |
| | | yes | 530 |
| PBBT | 2.0 | no | 390 |
| | | yes | 600 |
| PBO | 2.0 | no | 450 |
| | | yes | 630 |
| PBBO | 2.0 | no | 450 |
| | | yes | 580 |
| PI | 2.0 | no | 630 |
| | | yes | 700 |
| PPA | 2.0 | no | 460 |
| | | yes | 600 |
| PBI | 2.0 | no | 510 |
| | | yes | 600 |
| PPBI | 2.0 | no | 470 |
| | | yes | 570 |
| PT | 2.0 | no | 400 |
| | | yes | 590 |
| PPV | 2.0 | no | 490 |
| | | yes | 650 |

As will be apparent from the above results, the polymers indicated above are effectively converted into graphite films when subjected to the thermal treatment under isotropic pressure conditions and the rolling treatment. The electric conductivity of these graphite films is in the range of from 1.2 to $2.0 \times 10^4$ S/cm which is as good as that of the single crystal graphite. Moreover, the elementary analysis of these films revealed that all the films consisted of 100% carbon without detection of any other element. Thus, these graphite films had good mechanical strength and good quality.

When subjected to sealing tests in the same manner as in Example 1, it was found that these films had good sealing property and resistances to heat and pressure.

As will be apparent from the examples, the graphite films obtained according to the invention are higher in mechanical strength and quality and less in amount of impurity than the graphite film obtained by graphite powder according to known techniques and can be appropriately applied as a high-performance gasket or packing. In addition, the process of the invention is better than a known method of directly converting polymer film into a graphite film by high temperature treatment in that the graphite film with a significantly greater thickness can be obtained. Since the graphite film obtained by the process of the invention is flexible and tough, the composite article of the graphite film with a film or sheet of other material such as metals is readily obtained to have a structure which is easy to handle.

What is claimed is:

1. A process for making an artificial graphite film which comprises providing at least one film of a polymer selected from the group consisting of polyphenyleneoxadiazoles, polybenzothiazole, polybenzobisoxazole, poly(pyromellitimide), poly(p-phenyleneisophthalamide), poly(m-phenylenebenzoimidazole), poly(phenylenebenzobisimidazole), polythiazole and poly-para-phenylenevinylene, said at least one film having a thickness of not larger than 400 μm, subjecting said at least one film to thermal treatment at a temperature of not lower than 2400° C. in an inert gas atmosphere to graphitize the film, and rolling the graphitized film to obtain a graphite film having good flexibility and elasticity.

2. A process according to claim 1, wherein said at least one film has a thickness of not less than 25 μm.

3. A process according to claim 1, wherein said at least one film is thermally treated in an inert gas atmosphere at a normal pressure when the temperature is not lower than 1600° C., and when the temperature is finally raised to not lower than 2400° C.

4. A process according to claim 1, wherein the thermal treatment is effected in an inert gas atmosphere at an isotropic pressure of not lower than 0.1 Kg/cm².

5. A process according to claim 4, wherein the pressure is increased with an increasing thickness of said at least one film.

6. A process according to claim 4, wherein the thermal treatment is effected in an inert gas at an isotropic pressure of not less than 0.1 kg/cm² when the film has a thickness of not less than 100 μm.

7. A process according to claim 1, wherein the graphitized film is rolled at normal temperatures.

8. A process according to claim 1, wherein the rolling is effected at a linear pressure of not less than 2 kg/cm.

9. A process according to claim 1, wherein the rolled film is combined with another material to form a gasket.

10. A process according to claim 1, wherein said at least one film is thermally treated in an inert gas atmosphere under isotropic pressure when the temperature is not lower than 1600° C., and when the temperature is finally raised to not lower than 2400° C.

11. A process according to claim 1, wherein the graphitized film is rolled at elevated temperatures.

* * * * *